United States Patent [19]
Denney

[11] 3,738,809
[45] June 12, 1973

[54] GLUCOSE ASSAY AND REAGENTS THEREFOR

[75] Inventor: Jerry W. Denney, Carmel, Ind.

[73] Assignee: American Monitor Corporation, Indianapolis, Ind.

[22] Filed: Aug. 2, 1971

[21] Appl. No.: 168,020

[52] U.S. Cl. .............................. 23/230 B, 252/408
[51] Int. Cl. ...................... G01n 31/22, G01n 33/16
[58] Field of Search .................... 23/230 B; 252/408

[56] References Cited
UNITED STATES PATENTS
3,653,836   4/1972   Gruher et al. ...................... 23/230 B Primary Examiner—Joseph Scovronek
Assistant Examiner—R. M. Reese
Attorney—Robert A. Spray

[57] ABSTRACT

A colorimetric or spectrophotometric glucose assay, of ortho-toluidine type, in which certain dicarboxylic acids (succinic acid and hydroxysuccinic acid) or a tricarboxylic acid, citric acid, provide the promoter of the reaction of an aromatic amine with glucose, in a solvent system containing ethylene glycol or propylene glycol, desirably in the presence of a small amount of water.

12 Claims, 1 Drawing Figure

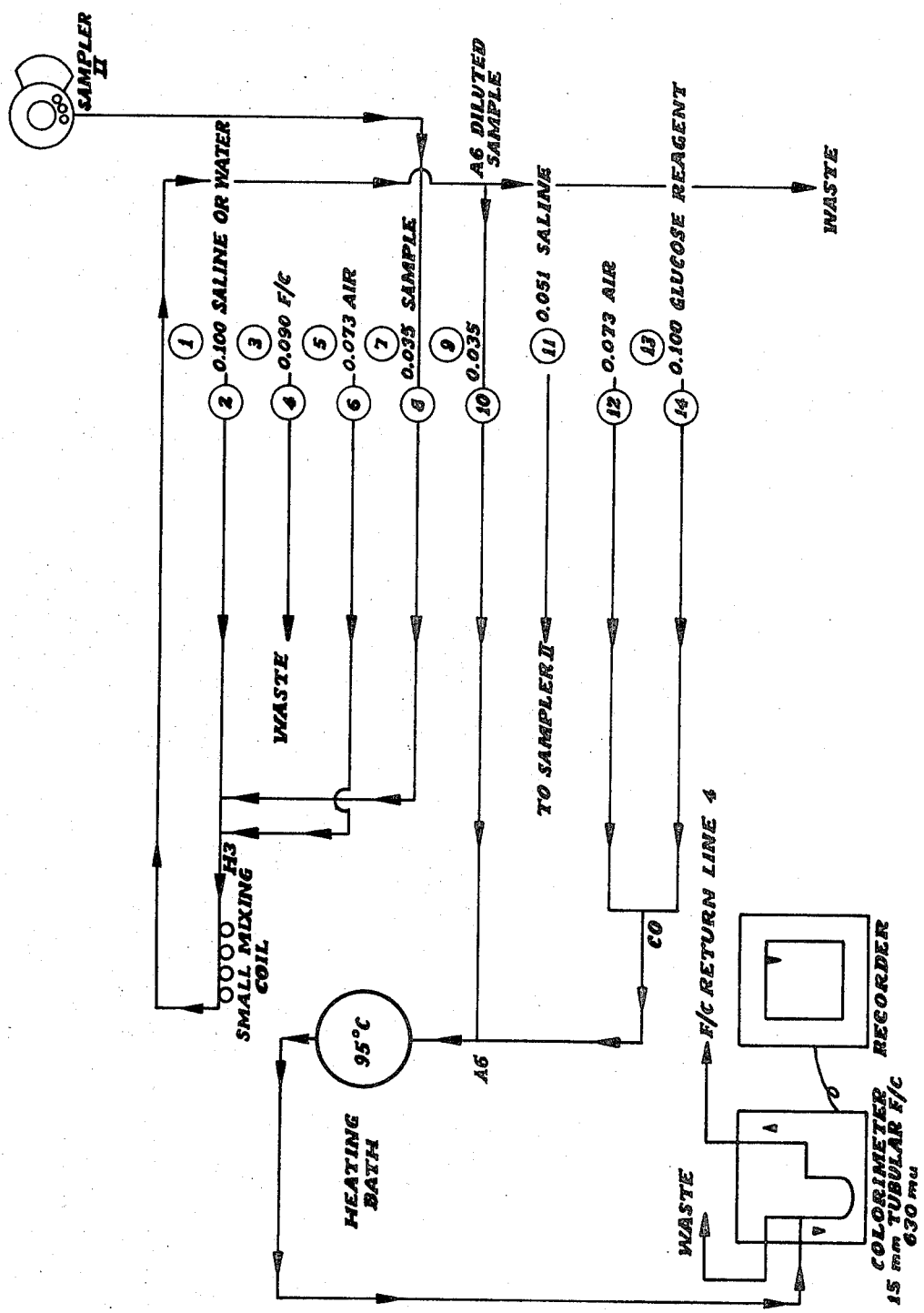

GLUCOSE ASSAY AND REAGENTS THEREFOR

INTRODUCTORY COMMENTS AS TO VITAL NEED FOR ACCURATE GLUCOSE DETERMINATIONS

The object of the invention is to measure glucose in blood serum, urine, and other biological fluids.

Glucose measurement is a vitally important assay. Perhaps it is most commonly performed in connection with the detection of diabetes, a condition in which the blood serum glucose is abnormally high due to failure of the body to metabolize carbohydrates in the diet. Another use of glucose measurement is in observing and evaluating the course of treatment of diabetic patients, particularly in determining their insulin requirements so that insulin may be specified in an amount which is neither unduly high nor unduly low. Diet tolerances must be evaluated.

The dreadfulness of diabetes as a disease, and its insulin treatability, are of course well known, and thus are not discussed here. Suffice it to say, for indicating the importance of glucose measurement, that considering the progressive and burdensome nature of diabetes, and the fact that its early-stage symptoms are relatively unburdensome and often unnoticed, and considering also the fact that the proper insulin treatment of diabetes requires a relatively small range of insulin dosage which is dependent upon the effectiveness of carbohydrate metabolism even in conjunction with closely-restricted diets, reliable glucose measurements are of extreme importance and significance.

Detection and measurement of low levels of glucose is also important in detecting and treating the condition of hypoglycemia which may have many causes including overdose of insulin or oral hypoglycemic agents or a variety of hormonal causes.

Furthermore, the quantitation of glucose in urine is important in not only testing and treating for diabetes but also a variety of kidney and pituitary problems.

GENERAL SUMMARIZATION OF PRIOR ART, INCLUDING COMMENTS AS TO DISADVANTAGES THEREOF AND AS TO DIFFICULTIES OF ACCURATE AND RELIABLE GLUCOSE DETERMINATIONS:

Early approaches to the measurement of glucose were generally based on the reducing properties of glucose. Perhaps the most common of the early methods was based on the reduction of cupric ion forming cuprous oxide. However, since protein is usually present in the specimen being assayed, and since protein also has reducing properties, an unwieldy protein-free filtrate is necessary for reliable glucose measurement by the copper reduction method. A further disadvantage of the copper reduction method is the fact that a variety of non glucose reducing substances which appear in various amounts in protein-free filtrate reduce copper and are mistakenly measured as glucose; and thus even the step of eliminating protein from the specimen does not and cannot assure accurate or reliable glucose measurement.

In an attempt to gain greater specificity in glucose measurement, by avoiding a measurement of reduction effect of substances other than glucose, the specific enzyme glucose oxidase has been employed. The basis of the quantitative test involving glucose oxidase is that the enzyme liberates hydrogen peroxide as it destroys glucose; and the hydrogen peroxide may be measured by causing it to react with a molecule which becomes colored due to its reaction with hydrogen peroxide. The enzyme peroxidase is used to accomplish the latter reaction. While glucose oxidase methods may give more specific quantitation of glucose than copper reduction methods, such specificity is obtainable only if an elaborate protein-free filtrate is made using zinc sulfate and barium hydroxide, which removes protein, uric acid and other substances which compete for hydrogen peroxide liberated.

But even if the glucose oxidase stage of the assay is specific as to its reaction with glucose, the overall assay is nevertheless unduly non-specific and correspondingly unreliable because of the fact that the peroxidase enzyme is very non-specific and may transfer the hydrogen peroxide to a number of non-color-forming substances in serum. This causes a negative error which would yield harmful disadvantages, such as a diabetic condition going undetected, insulin dosage to be prescribed too low, or a patient might be diagnosed as hypoglycemic thus causing unnecessary treatment. The problems mentioned above are true to an even greater extent when the test is performed on urine.

Another type of glucose quantitation has been based upon its ability to reduce alkaline ferricyanide solutions, changing them from yellow to colorless solutions. While the method has gained wide use as an automated method, it has the disadvantage of being non-specific for sugars (since creatinine, uric acid, glutathione, ascorbic acid and other substances also react), and it has the disadvantage of requiring a cumbersome protein-free filtrate or dialysis, and because it is a color loss reaction which means that low levels of glucose give optical density shift in the high absorbence ranges which are relatively more difficult to measure and which accordingly is often associated with consequent loss of accuracy.

The requirement for dialysis causes the laboratory to purchase a dialyzer module for its equipment, it prolongs the length of time required to obtain results, and often causes maintenance problems in as much as dialysis membranes rupture from time to time and are bothersome and cumbersome to repair. The rupture of dialysis membranes often occurs during an assay, making it not only necessary to repair the membrane but also to begin the test over again.

A more recent approach to glucose analysis, for hopefully solving the problems of specificity and ease of analysis required in a hospital laboratory, has been the use of the fact that various aromatic amines react with glucose in hot glacial acetic acid forming a green color. The use of a suitable aromatic amine to react with glucose to produce an observable color may be described as an ortho-toluidine type glucose procedure. Ortho-toluidine in glacial acetic acid has gained wide use because of its relative specificity and relative ease of analysis; but its specificity is less than desired, and its use in the assay involves procedural and other problems now mentioned.

The problems with the specificity of the orthotoluidine and acetic acid procedure primarily relate to:

a. Bilirubin (a substance virtually always present in serum) also forms a green color in the reagent; and the disadvantage of this bilirubin effect is emphasized by the fact that 1 mg of bilirubin gives about twice as much color as 1 mg of glucose. Thus bilirubin is mistakenly measured as glucose.

b. A further disadvantage reported by C. S. Frings (Frings, Christopher S., "Effect of Dextrans on o-Toluidine Methods for Glucose," *Clinical Chemistry*, Vol. 16, No. 7, 1970, p. 618.) is the fact that dextrans, which are commonly administered to hospitalized patients, cause gross to moderate turbidity in the test and render it unusable even if the dextrans-turbidity problem is recognized; and if the problem is not recognized, may cause gross error as would result from the turbidity being interpreted as an elevated level of blood glucose because of its interference in the spectrophotometric measurement. Thus, if the dextrans-turbidity problem were not recognized and not fully taken into account, a non-diabetic patient might be mistakenly given insulin due to the test misinterpretation and the consequent mistaken understanding that he is a diabetic; and this mistakenly-prescribed treatment might result in insulin shock.

c. A further disadvantage of presently used ortho-toluidine methodology is the fact that hot glacial acetic fumes and vapors are very caustic and pungent, and are thus very unpleasant and even dangerous to the analyst. These fumes and the vapor pressure associated with them make automation by the commonly used continuous flow approach difficult since pressure builds in the system possibly causing erratic results. Furthermore, the tubing used in the system may separate from the device connections, permitting that pressure to propel a stream of dangerous liquid into the air. Obviously this is a particular hazard to the laboratory workers' eyesight. Because of the caustic nature of the reagents commonly used in ortho-toluidine glucose assay, the proportioning tubing used in the automation devices is rapidly destroyed even though special and relatively costly acid-resistant tubing is used. To avoid this problem of tube-breakage, it has been recommended that the pump tubing be replaced daily, but this greatly increases the costs of analysis.

In spite of the fact that ortho-toluidine in glacial acetic acid has been recommended over other methods of automated analysis, it has gained only limited use, perhaps because of the unpleasantness associated with the reagents.

The above disadvantages have been a long-standing and continuing problem; and thus, in order to avoid the disadvantages of glacial acetic acid in ortho-toluidine methodology, Yee et al. (Yee, Hugh Y., et al., "Modified Manual or Automated o-Toluidine System for Determining Glucose in Serum, with an Improved Aqueous Reagent," *Clinical Chemistry*, Vol. 17, No. 2, 1971, p.103.) in 1970 diluted glacial acetic acid approximately in half with water and added 8 percent citric acid to enhance the absorbence, for a specified purpose of decreasing heating time.

While the reagent of Yee et al. is somewhat less damaging to pump tubing in automated systems and is somewhat less undesirable from the standpoint of caustic fumes, the fumes do remain a problem. Furthermore the reagent causes significant pressure to develop in continuous flow analyzers so that pulse suppressors must be used to reduce surging; and the possibilities of lines separating, thus emitting dangerous liquid upon the analyst, still remains.

Moreover, the method of Yee et al. requires a protein free filtrate of dialysis which is troublesome, as is indicated by the express statement of Yee et al. relative to their own methodology that "The dialyzer is a recurring source of problems," requiring "a vigorous program of maintenance" to minimize down time. A further disadvantage of the reagent of Yee et al. is that the sensitivity is low, there being so little color formed from glucose that a normal glucose gives less than 0.1 OD units in Yee's manual method and correspondingly low sensitivity in Yee's automated method.

DESCRIPTION OF THE DRAWINGS

Most of the nature of the inventive concepts does not admit drawings to clarify or illustrate the concepts. However, Embodiment No. 6, below, contemplates the use of analyzer equipment such as a Technicon Autoanalyzer; and a flow-chart thereof is illustratively set forth in the FIGURE of drawings.

THE PRESENT INVENTION

In the present invention an absorbence in the neighborhood of 0.35 OD is obtained with a normal serum using only 0.05 ml of serum. The much greater sensitivity of the present invention allows more precise measurements. The reagents prepared by the present invention are used without a protein free filtrate or dialysis and do not produce the caustic fumes associated with earlier procedures.

By concepts of the present invention, an ortho-toluidine type glucose reagent is prepared in the present invention by dissolving certain dicarboxylic and/or the tricarboxylic acids in ethylene glycol and/or propylene glycol, desirably containing at least a small amount of water, and using this mixture in place of acetic acid in the prior art.

While acetic acid is usually used in concentrated form, a range of only about 15 to 20% W/V of the proper dicarboxylic and/or tricarboxylic acid is required to obtain an operable system in the present invention.

THE PRESENT INVENTION EMBODIMENTS

Embodiment No. 1:
 Reagent:
  200 ml $H_2O$
  800 ml ethylene glycol
  200 grams hydroxysuccinic acid
  3 grams thiourea
  10 grams boric acid
  130 ml ortho-toluidine Assay method: The above reagent is used in the following test procedure: 6 ml of the reagent is added to a tube labeled "blank" and to "test" tube. 0.05 ml of sample is added to the test tube. After mixing the "test" thoroughly, both tubes are heated at 100° C (boiling water) for 10 minutes after which they are cooled in room temperature water for 3 minutes. The absorbence of the test is measured against the blank at 630 nm. The glucose concentration in the test is proportional to the absorbence of a known standard assayed by the same method. Glucose samples with a concentration above 300 mg percent should be diluted with water so that their absorbence falls within the absorbence range of a 300 mg percent standard since at higher absorbencies the color produced is not linearly related to concentration or is too high to read accurately on a spectrophotometer.

Embodiment No. 2:

As embodiment No. 1, except propylene glycol is substituted for ethylene glycol.

Embodiment No. 3:

As Embodiment No. 1, except succinic acid is substituted for hydroxysuccinic acid.

Embodiment No. 4:

As Embodiment No. 1, except citric acid is substituted for hydroxysuccinic acid.

Embodiment No. 5:

500 ml H$_2$O
500 ml ethylene glycol
200 grams hydroxysuccinic acid
3 grams thiourea
25 grams boric acid
1 gram edta (acid form)
130 ml ortho-toluidine The above reagent is used in the assay procedure given in Embodiment No. 1, except that the tubes are heated for 20 minutes and a standard curve is prepared.

Embodiment No. 6:

The reagent is used in an automated flow manifold on the Technicon (TM Technicon N.Y.) as illustrated in the FIGURE of drawings. The following is the glucose reagent there indicated:

1 liter ethylene glycol
150 grams hydroxysuccinic acid
3 grams thiourea
10 grams boric acid
130 ml ortho-toluidine Water is added in a resampling process as a part of the automated procedure.

Embodiment No. 7:

The reagent as in Embodiment No. 1, except hydroxyacetic acid substituted for hydroxysuccinic acid.

Embodiment No. 8:

The reagent as in Embodiments 1–7 except 120 grams of aniline acetic acid, benzidine, aniline or 2-aminobiphenyl are substituted for ortho-toluidine and the spectrophotometric observation is made at the corresponding optimal absorbence.

Although Yee et al. used citric acid in an orthotoluidine glucose method, they retained the use of acetic acid in a concentration of approximately 50 percent, thus retaining the undesirable features of the acetic acid. That they retained the acetic acid in spite of these disadvantages seems unquestionably due to the fact that the citric acid in the concentration used is unworkable in their method without the glacial acetic acid.

In order to make citric acid workable alone in the Yee et al. method, the concentration would have to be increased to the point that the solution would be extremely viscous and therefore undesirable or virtually unusable for either manual or automated assay of glucose. However, when citric acid is used in combination with ethylene glycol or propylene glycol with a small amount of water, as in the present invention, the low concentration of citric acid is workable and has the added advantages other than being less caustic than glacial acetic acid.

After the discovery of the present inventive concepts, it may possibly be of some interest to try to look backwards in time and assay methodologies to try to discern reasons why these present concepts were not discovered before and were unobvious, particularly noting that the acetic acid of the unsatisfactory prior art procedures may be asserted to be in certain senses similar or associated with the dicarboxylic and tricarboxylic acids used in the present concepts, for indeed acetic acid may be designated as a carboxylic acid, although it is a monocarboxylic acid in contrast to either a dicarboxylic or a tricarboxylic acid.

If this backward-vision were attempted, it may be first noted that dicarboxylic acids are generally solids, not usable without a suitable solvent, while acetic acid is a liquid, and thus serves both as a solvent and an acid promoter. Furthermore, if dicarboxylic acids were nevertheless to be tried, the simplest compound in the class of dicarboxylic acids, to-wit, oxalic acid, HOOC — COOH, forms a precipitate with ortho-toluidine in combination with ethylene glycol and thus is not even operable in a colorimetric or spectrophotometric assay using toluidine, even if the investigator were to choose ethylene glycol.

Likewise, the structurally simple dicarboxylic acid, tartaric acid, having a structure:

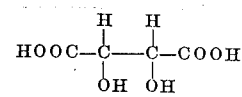

is unoperative and unworkable in these type assays, because it too forms a precipitate. Likewise inoperative and unusable because of a precipitate formation is fumaric acid, which has a structure:

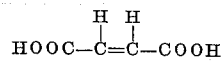

However, according to concepts of the present invention, it has been discovered that hydroxysuccinic acid having a structure:

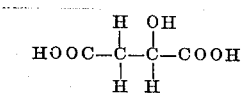

and succinic acid having a structure:

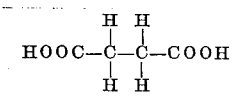

are operable in the system, providing a catalytic effect with aromatic amines such as ortho-toluidine in reaction with glucose. It will be noted that hydroxysuccinic acid differs only by virtue of one hydrogen atom substituted for one of the hydroxyl groups of the tartaric acid which is inoperable. It will be noted that succinic acid differs from the inoperable tartaric acid only in having two hydrogens replacing the hydroxyl groups, from the inoperable oxalic acid only by having two hydrogen-containing carbon atoms between the carboxyl groups, and from the inoperable fumaric acid only by having the two central carbon atoms saturated with two additional hydrogen atoms.

Thus while the carboxyl groups, possessed by the succinic or hydroxysuccinic acids used in the present invention in contrast to the acetic acid used in the prior art, is the common factor, the factor determining operability resides not with the common factor but with other atoms of the molecule, and even then only if used in combination with a suitable solvent such as ethylene glycol or propylene glycol.

Malonic acid having the structure:

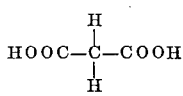

is operable but seems less desirable than hydroxysuccinic and succinic acids in this invention since it gives a reduced sensitivity for glucose in the assay and is more costly than other operable acids used in this invention.

Citric acid having the structure:

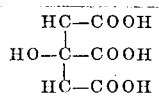

which is a tricarboxylic acid, has been found to be operable but is slightly less desirable than succinic and hydroxysuccinic acids since the reagent prepared using citric acid forms some color upon standing which somewhat elevates the reagent blank in the glucose assay.

The solvent system chosen for dissolving the dicarboxylic or tricarboxylic acids must be capable of dissolving the aromatic amine used as well as the dicarboxylic or tricarboxylic acids. Alcohols in general have these properties, but alcohols generally have either too low a boiling point and/or precipitate protein present in the sample, causing turbidity, unless the undesirable dialysis step is performed.

Ethylene glycol and propylene glycol, although each a type of alcohol, have been discovered to be workable as solvents in this assay; however, it has been found that vigorous mixing with the reagent prepared with ethylene glycol or propylene glycol (in the absence of water) is apparently necessary, otherwise turbidity or erratic results may occur. It has been discovered that the addition of about 10–40% V/V of water to the ethylene glycol or propylene glycol greatly facilitates homogenization of the sample with the reagent, and that in using a reagent so prepared, turbidity is virtually never encountered, thus simplifying the test and thus also providing more certainty of the accuracy without the necessity of an undesirable dialysis step.

The combination of succinic acid and/or hydroxysuccinic acid and/or citric acid with ethylene glycol or propylene glycol containing a small amount of water achieves the desired goal unachieved in prior art methods. That is, (a) it provides an ortho-toluidine type glucose reagent which does not have noxious acid fumes and in which the vapors do not build up substantial pressure in continuous flow systems. In addition to this advantage, it has (b) the unexpected effect of greatly reducing or eliminating the interference due to bilirubin which seems to be often incident to prior art glacial acetic acid methods. The supression of bilirubin interference seems to be a property of the ethylene and propylene glycols containing a small amount of water, as opposed to the succinic, hydroxysuccinic, or citric acids. Furthermore, an additional advantage of the present invention is that (c) the problem of dextrans interference due to turbidity formation in prior acetic acid methods is eliminated by the combination used in this invention, since dextrans are soluble in the mixtures used in the operable formula given in the present invention.

Thus the combination of the two compounds has a combination of properties not possessed by either alone; that is, the invention achieves the properties of having no noxious acid fumes, no high vapor pressure, virtually no interference from bilirubin, and freedom from dextrans interference.

SUMMARIZATION

An assay according to the novel concepts of the present invention thus provides multiple advantages: (a) Great sensitivity allowing reliability of precise measurements, showing not only precision of actual values but also reliably detecting minor increases or decreases in glucose levels; (b) avoidance of bother, expense, and error-production aspects of providing a protein-free filtrate; (c) avoidance of the caustic fumes associated with other procedures; (d) avoidance of the extremely high viscosity of prior art procedures modified in proportions to utilize citric acid without the glacial acetic acid; (e) avoidance of vapors which build up substantial pressure; (f) greatly reducing or eliminating interference due to bilirubin; and (g) avoidance of problem of dextrans interference by solubilizing dextrans rather than permitting turbidity formation.

Accordingly, it will thus be seen from the foregoing description of the invention according to the embodiments of the invention herein set forth, that the present invention provides a new and useful assay yielding quantitative determination of glucose, and provides a method and reagents therefor, all having desired advantages and characteristis, and accomplishing the objects of the invention including the objects and advantages hereinbefore pointed out and other which are inherent in the invention.

It will be understood that modifications and variations of the general and specific concepts of the overall assay may be effected without departing from the novel concepts of this invention; accordingly, the invention is not to be considered limited to the specific form or embodiments set forth herein for the purpose of disclosing and illustrating the inventive concepts discovered and herein applied. For example, the larger the amount of water used, the longer the reaction time at 100° C; and this if a longer reaction time is desirable, as much as 50 percent water may be included in the glycol.

What is claimed is:

1. A process for the quantitative colorometric or spectrophotometric determination of glucose in an ortho-toluidine type assay, wherein the improvement comprises adding one or more of the acids of the group consisting of succinic acid, hydroxysuccinic acid, and citric acid, as promoters of the reaction of an aromatic amine with glucose, the said acids being dissolved in a solvent miscible with both the acids and the glucose solution to be assayed.

2. The process as set forth in claim 1 in which the aromatic amine is ortho-toluidine.

3. The process as set forth in claim 1 in which said solvent is of a group consisting of ethylene glycol, propylene glycol, and water solutions of ethylene glycol or propylene glycol, and in which the aromatic amine is ortho-toluidine.

4. The process as set forth in claim 1 in which the solvent is one of the group consisting of ethylene glycol and propylene glycol.

5. The process as set forth in claim 4 in which water is added to or present in the glycol as an homogenizer.

6. A process for the quantitative colorometric or spectrophotometric determination of glucose in an ortho-toluidine type assay, wherein the improvement comprises adding nitric acid as a promoter of the reaction of an aromatic amine with glucose, in an assay in which the glucose reagent is in the absence of acetic acid, the said citric acid being dissolved in a solvent miscible with both the acid and the glucose solution to be assayed.

7. The process as set forth in claim 5 in which the aromatic amine is ortho-toluidine.

8. The process as set forth in claim 6 in which the solvent is one of the group consisting of ethylene glycol and propylene glycol.

9. The process as set forth in claim 8 which water is added to or present in the glycol as an homogenizer.

10. A process for the quantitative colormetric or spectrophotometric determination of glucose in an ortho-toluidine type assay, wherein the improvement comprises adding one of the group consisting of ethylene glycol, ethylene glycol and water, propylene glycol, and propylene glycol and water, as a solvent in a glucose reagent of orthotoluidine type.

11. A process as set forth in claim 10 in which a carboxylic acid is added as promoter of the reaction of aromatic amine with glucose.

12. A process as set forth in claim 10 in which the carboxylic acid is one of the group consisting of acetic acid in a concentration of less than 40%, dicarboxylic acid, and tricarboxylic acid.

* * * * *

UNITED STATES PATENT AND TRADEMARK OFFICE
CERTIFICATE OF CORRECTION

PATENT NO. : 3,738,809
DATED : June 12, 1973
INVENTOR(S) : Jerry W. Denney

It is certified that error appears in the above-identified patent and that said Letters Patent are hereby corrected as shown below:

Column 8, line 36, "characteristis" should read -- characteristics --.

Column 8, line 49, "this" should read -- thus --.

Column 8, line 38, "other" should read -- others --.

Column 9, line 9, "nitric" should read -- citric --.

Column 10, line 14, "10" should read -- 11 --.

Signed and Sealed this

Sixteenth Day of October 1979

[SEAL]

Attest:

RUTH C. MASON
Attesting Officer

LUTRELLE F. PARKER
Acting Commissioner of Patents and Trademarks